(12) United States Patent
Sun

(10) Patent No.: US 6,415,068 B1
(45) Date of Patent: *Jul. 2, 2002

(54) MICROLENS SWITCHING ASSEMBLY AND METHOD

(75) Inventor: Decai Sun, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 62 days.

This patent is subject to a terminal disclaimer.

(21) Appl. No.: 09/610,673

(22) Filed: Jul. 7, 2000

(51) Int. Cl.$^7$ .................................................. G02B 6/35
(52) U.S. Cl. ............................. 385/16; 385/18; 385/23; 359/813; 359/814
(58) Field of Search .............................. 385/16, 18, 23; 359/813, 814

(56) References Cited

U.S. PATENT DOCUMENTS

| 5,025,346 | A | * | 6/1991 | Tang et al. | 361/283 |
| 5,734,490 | A | * | 3/1998 | Rabarot et al. | 359/210 |
| 5,861,992 | A | * | 1/1999 | Gelbart | 359/619 |
| 5,923,480 | A | * | 7/1999 | Labeye | 359/814 |
| 6,091,537 | A | * | 7/2000 | Sun et al. | 359/248 |
| 6,229,640 | B1 | * | 5/2001 | Zhang | 359/290 |
| 6,295,171 | B1 | * | 9/2001 | Chao et al. | 359/813 |

OTHER PUBLICATIONS

Publications "Micromachined Optical Switches for Free–Space Bean Steering" by Hiroyuki Fujita, et al., pp. 19–20, "MEM Mirrors Application in Optical Cross–Connects" by Herzel Laor pp. 21–22 and "Micromechanical Fiber Optic Switches Based on Electromagnetic Torsion Mirrors" by H. Toshiyoshi, et al., pp. 23–24, all of the IEEE/LEOS Summer Topical Meeting in Monterey, CA, ISSN: 1099–4742, Jul. 1998.

*Scanning Microlens Shuttles Fabricated Using Silicon–On–Insulator Wafers,* Decai Sun, Chingwen Yeh and Michel Rosa, Xerox Palo Alto Research Center (No date).

* cited by examiner

*Primary Examiner*—John D. Lee
*Assistant Examiner*—Jennifer Doan
(74) *Attorney, Agent, or Firm*—Oliff & Berridge, PLC

(57) ABSTRACT

A microlens switching assembly and a method for optical switching uses a microlens switching assembly. The microlens switching assembly uses a microelectromechanical system-based comb drive, or other drive mechanism, to move a microlens or microlens array in a direction perpendicular to the optical axis to switch a signal between a signal source and a signal receiver. The microlens is carried by a support member that is suspended from a substrate by a pair of folded springs. This allows the microlens to be moved rapidly to provide fast switching. The signal source and the signal receiver may be optical fibers or a laser source and one or more photodetectors. In the case of optical fibers, the switching provided by the microlens switching assembly and method may be an attenuation of the signal that is received by an output optical fiber.

22 Claims, 4 Drawing Sheets

MICROLENS SWITCHING ASSEMBLY AND METHOD

BACKGROUND OF THE INVENTION

1. Field of the Invention

This present invention relates to a microlens switching assembly and optical switching using a microlens switching assembly.

2. Background of the Invention

Optical switches are becoming important components in fiber-optic communication networks for fast switching. In particular, advancements in the optical application of microelectromechanical systems (MEMS) has made fiber communication networks one of the most promising markets for optical microelectromechanical systems. Micro-optomechanical switches offer a cost-effective method for improving reliability and flexibility of communication networks.

There are two major types of micro-optomechanical switches currently known. One involves movable optical fibers or optical waveguides. The second involves movable micromirrors inserted in the light path in free space. A light beam traveling the light path between optical fibers or waveguides is reflected by a micromirror along a different light path so that the beam may be coupled to a desired output optical fiber or waveguide. Micromirror switches provide distinct advantages over switches that move the optical fibers or waveguides themselves. In particular, the size of the switch is very small because the beam can be reflected at an arbitrary angle. Multiple switching is also possible in a single device because the light beams will not interfere with each other in free space. Also, only a small driving force is required to move the micromirrors, much less than that needed to move optical fibers and waveguides.

Further development of micromirror switches has been directed to reducing the insertion loss due to coupling loss across the free space and reflection loss at the micromirror. The coupling loss may be decreased by having a small distance between the ends of the fibers or waveguides, by collimating the light beam, and by accurate alignment. The reflection loss may be decreased by smoother mirror surfaces and by mirror surfaces covered by high reflectance metals.

SUMMARY OF THE INVENTION

This invention provides systems and methods that use a microlens to selectively direct a signal from a source to a receiver.

This invention separately provides systems and methods that use a microlens to attenuate a signal received by a receiver from a source by directing the signal at least partially away from the receiver.

This invention separately provides systems and methods that use a microlens to selectively direct a signal from a source to one or more receivers of an array of receivers to switch the signal between the receivers of the array.

This invention separately provides systems and methods that use a microlens to selectively direct a signal from an input optical fiber to an output optical fiber.

This invention separately provides systems and methods that use a microlens to attenuate a signal received by an output optical fiber from an input optical fiber by directing the signal at least partially away from the output optical fiber.

This invention separately provides systems and methods that use a microlens to selectively direct a signal from an input optical fiber to one or more output optical fibers of an array of output optical fibers to switch the signal between the output optical fibers of the array.

This invention separately provides systems and methods that use a microlens to selectively direct laser light from a laser light source to a photodetector.

This invention separately provides systems and methods that use a microlens to selectively direct laser light from a laser light source to one or more photodetectors of an array of photodetectors to switch between the photodetectors of the array.

In various exemplary embodiments of the systems and methods of this invention, a microelectromechanical system (MEMS) drives a microlens between various positions. The microelectromechanical system may be comb-drive actuated and may include an elastically suspended support member that carries the microlens. The driver, the support member and the elastic suspension structure each may be made using a semiconductor material.

The microelectromechanical system-based comb-drive actuated microlens switching assembly according to this invention provides fast switching of signals. In various exemplary embodiments, the microlens switching assembly offers one or more advantages of small size, multiple switching and/or small required driving force. Further, in various exemplary embodiments, the microlens does not require any additional collimation device to reduce coupling loss. Additionally, in various exemplary embodiments, the microlens switching assembly involves only linear movement of the microlens, thus reducing complexity and increasing accuracy and reliability.

These and other features and advantages of this invention are described in or are apparent from the following detailed description of various exemplary embodiments of the systems and methods according to this invention.

BRIEF DESCRIPTION OF THE DRAWINGS

The invention will be described in relation to the following drawings in which like reference numerals refer to like elements, and wherein.

DETAILED DESCRIPTION OF EXEMPLARY EMBODIMENTS

A related scanning microlens assembly is disclosed in copending U.S. patent application Ser. No. 09/209,347, filed on Dec. 11, 1998, now U.S. Pat. No. 6,091,537, which is incorporated herein by reference in its entirety. In various exemplary embodiments of the microelectromechanical system-based optical switching systems and methods according to this invention, using a microelectromechanical system-based. comb drive, or other drive mechanism, a microlens or microlens array moves in a direction perpendicular to its optical axis to switch a signal between a signal source and a signal receiver. The microlens can be moved rapidly to provide fast switching. Further, in various exemplary embodiments, the microlens according to this invention is silicon-based, which is easier to fabricate than galium arsenide-based microlenses. The microlens according to this invention can be easily fabricated in large-area one-dimensional or two-dimensional microlens arrays. Thus, according to this invention, batch-fabricated at low cost.

The signal source and the signal receiver may be input and output optical fibers or a laser source and one or more photodetectors. In the case of optical fibers, the switching provided by the microlens switching assembly and method according to this invention may be an attenuation of the signal that is received by an output optical fiber.

Using the microlens to switch a signal in this way allows the signal to be collimated without any additional collimating lenses or other devices, or allows the signal to be focused without any additional focusing lenses or other devices. Further, in various exemplary embodiments, the microlens may be arranged to move in a direction parallel to the optical axis of the microlens, so that the focus of the microlens is changed.

Figure 1:
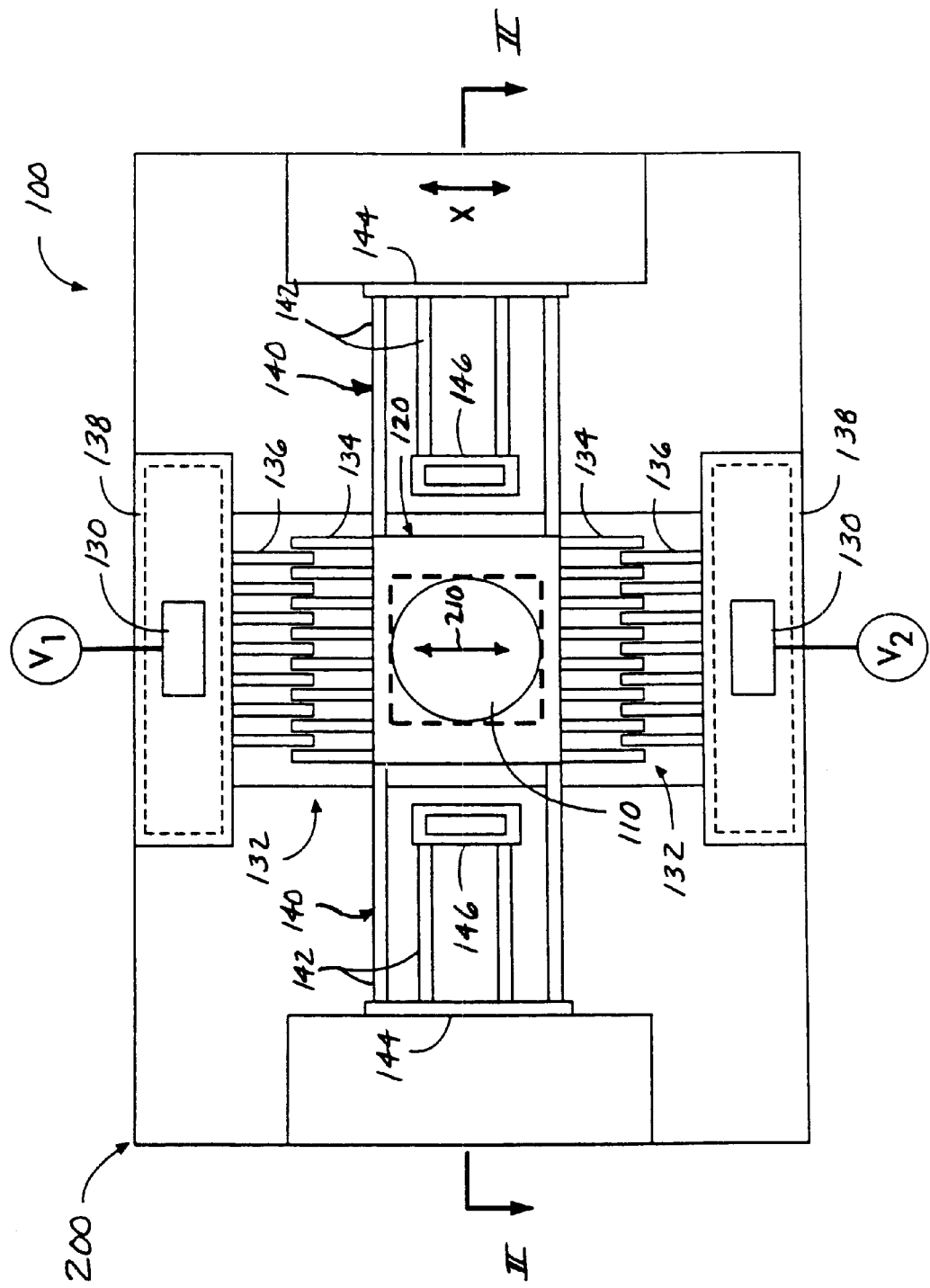
FIG. 1 is a top view of an exemplary embodiment of a microlens switching assembly according to this invention.
Figure 2:
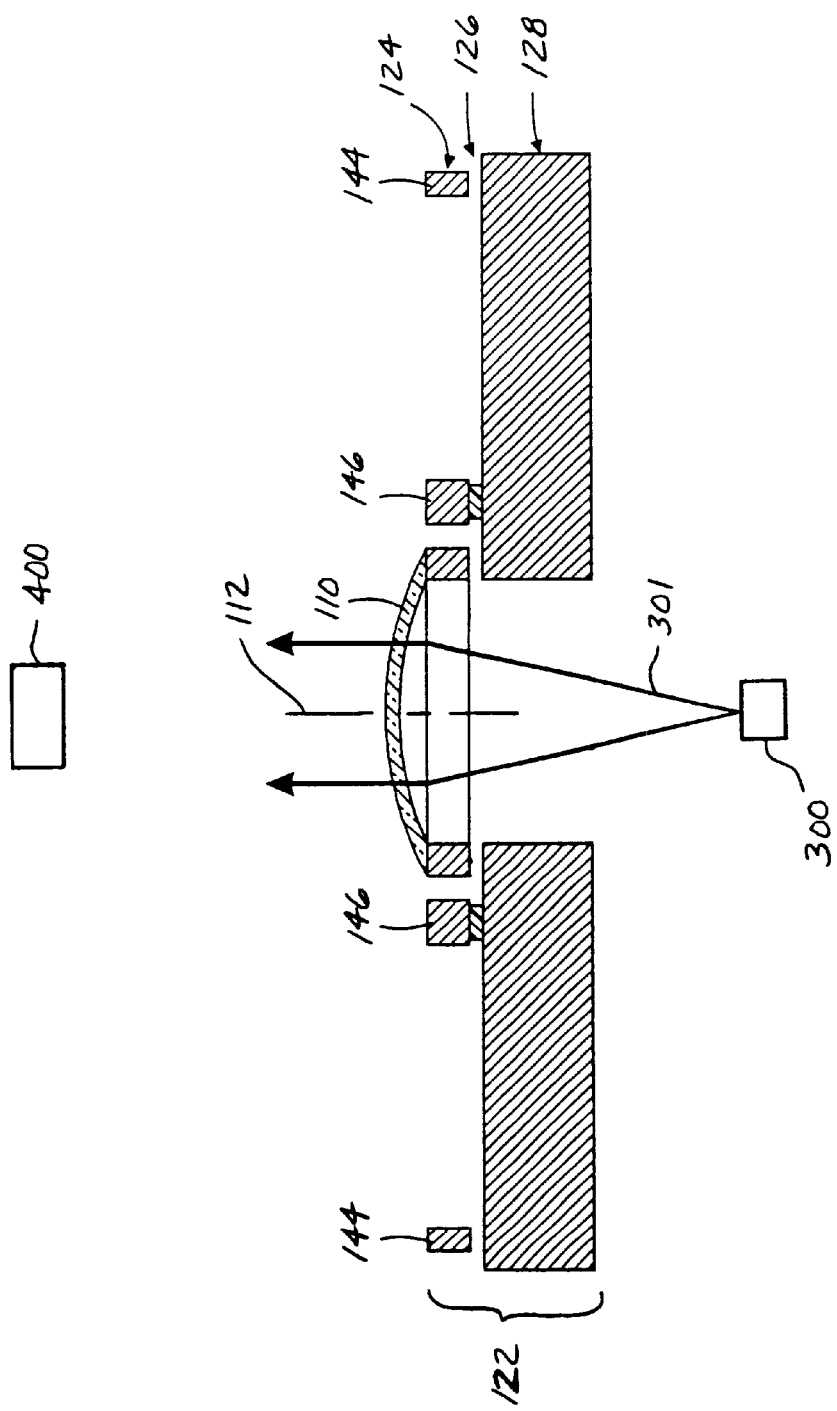
FIG. 2 is a cross-sectional view of the microlens switching assembly of FIG. 1 taken along line II—II.

FIGS. 1 and 2 show an exemplary embodiment of a microlens switching assembly 100 according to this invention. As shown in FIGS. 1 and 2, the microlens switching assembly 100 includes a microlens 110 having an optical axis 112. The microlens 110 is carried by a support member 120, which is movable in a direction X perpendicular to the optical axis 112. In various exemplary embodiments, the support member 120 is formed using a silicon-on-insulator (SOI) ($Si/SiO_2/Si$) wafer 122 having a single-crystal silicon device layer 124, a silicon dioxide layer 126 and another silicon layer 128. Techniques for fabricating the microlens 110 are disclosed in the incorporated '347 application.

In various exemplary embodiments of the microlens switching assembly, the support member 120 is suspended on a semiconductor substrate 200 by a pair of folded springs 140. Each of the folded springs 140 includes one or more spring arms 142 connected by a connecting beam 144. Each of the folded springs 140 is anchored to the semiconductor substrate 200 at an anchor point 146. The folded springs 140 are designed to facilitate fast optical switching. While the microlens switching assembly 100 is shown using the folded springs 140, it should be appreciated that any known or later developed device or structure that flexibly attaches the microlens 110 to the semiconductor substrate 200 can be used in place of the folded springs 140. For example, other known suitable elastic devices and/or other configurations, such as, for example, straight beams, may be used in place of the folded springs 140.

In various exemplary embodiments of the microlens switching assembly, the support member 120 and the microlens 110 are driven by a pair of micro-electro-mechanical-system-based comb drives 130. Each of the comb drives 130 includes a set of interdigitated comb fingers 132. The set of interdigitated comb fingers 132 includes a set of movable fingers 134 attached to the support member 120. In various exemplary embodiments, the movable fingers 134 extend from the single-crystal silicon layer 124. The set of interdigitated comb fingers 132 also includes a set of static fingers 136 attached to the semiconductor substrate 200 at a comb spine 138.

The support member 120 and the microlens 110 move in a first direction along a motion axis 210 upon an actuation voltage V1 being applied between the static fingers 136 and the movable fingers 134 of one of the comb drives 130. Similarly, the support member 120 and microlens 110 moved in an opposite direction along the motion axis 210 upon an actuation voltage V2 being applied between the static fingers 136 and the movable fingers 134 of the other one of the comb drives 130.

Electrostatic forces cause the movable fingers 134 of the driven comb drive 130 to "pull in" toward the comb spines 138 of the static fingers 136, and vice-versa, to minimize the energy stored between the static and movable fingers 136 and 134. Since the movable fingers 134 are attached to the support member 120, this electrostatic actuation causes the support member 120 and the microlens 110 to move to a new position, with the spring arms 142 of the folded springs 140 deflecting under the force of the comb drives 130.

In a first order system, the position of the support member 120 and the microlens 110 will be proportional to the electrostatic force, which is proportional to the square of the actuation voltage V1 or V2 applied to the driven comb drive 130. The support member 120 and the microlens 110 may move from one extreme position to the other extreme position at a resonant frequency on the order of 1 kHz. In various exemplary embodiments, the support member 120 and the microlens 110 can move at a resonant frequency of at least 100 kHz, depending on the spring constant of the folded springs 140 and the mass of the support member 120 and the microlens 110.

The electrostatic comb drives 130 may be replaced with any appropriate known or later developed actuation system. For example, a thermo-actuator, as opposed to an electrostatic actuator such as the comb drives 130, may be used. Also, a scratch drive actuator may be used. However, a scratch drive actuator is slower and provides a larger force than the electrostatic comb drives 130.

The in-plane shape of the support member 120, the comb drives 130 and the folded springs 140 is arbitrary within fairly wide limits. Mechanical designs, such as straight beam suspensions, tapered or stepped comb fingers, x/y folded spring suspensions, torsional springs, and archimedian spiral springs providing a rotational degree of freedom, which are well-known silicon structures, may be used to form the microlens switching assembly 100 without departing from the separate scope of this invention.

As shown in FIG. 2, a signal source 300 is arranged to transmit a signal or optical beam 301 through the microlens 110 of the microlens switching assembly 100. When the signal source 300 is at a focal point of the microlens 110, as illustrated in FIG. 2, the optical beam 301 is collimated. As will be understood from the description of the exemplary embodiments shown in FIGS. 4–6 and 7–9, moving the microlens 110 along the motion axis 210 will cause the optical beam 301 to "bend," and thus to be directed away from the optical axis 112. Thus, when a signal receiver 400 is aligned with the optical axis 112 to receive the signal or optical beam 301, moving the microlens 110 in this way causes the microlens 110 to direct the signal 301 at least partially away from the signal receiver 400. Thus, the signal 301 can be switched completely away from the signal receiver 400 by moving. the microlens 110 to an "off" position.

It should be appreciated that, for some switching applications, the amount of movement of the microlens 110 can be controlled to only partially switch the signal 301 away from the receiver 400. As a result, rather than completely removing the signal 310 from the receiver 400, the signal 301 on the receiver 400 is attenuated.

Figure 3:
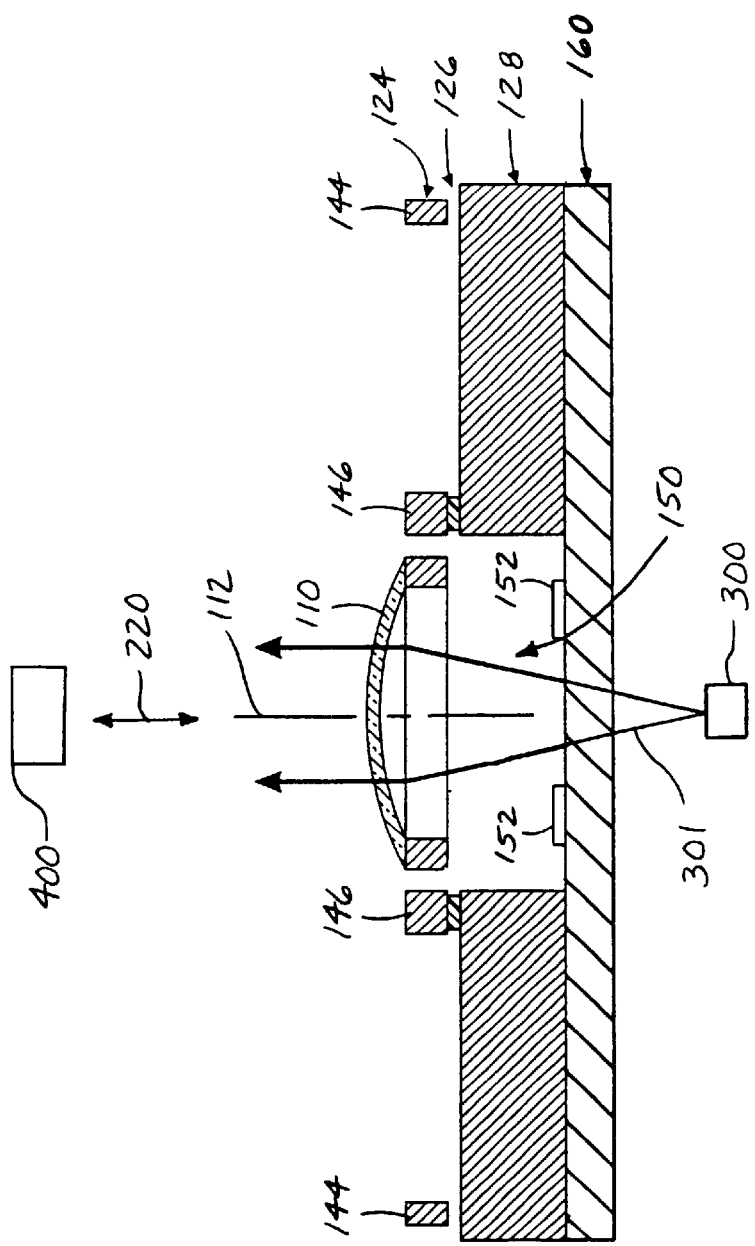
FIG. 3 is a cross-sectional view similar to FIG. 2 of another exemplary embodiment of a microlens switching assembly according to this invention.

FIG. 3 illustrates a second exemplary embodiment of a microlens switching assembly 100 according to this invention. In this second exemplary embodiment, the support 120, and thus the microlens 110, is additionally movable along a focus axis 220 that is parallel to the optical axis 112. Moving the microlens 110 along the focus axis 220 adjusts the focus of the signal 301 on the receiver 400. In this second exemplary embodiment, the folded springs 140 are arranged to flex along the focus axis 220 when the support member 120 is pulled into a space 150 in the silicon layer 128 by an electrostatic force generated between a pair of electrodes 152 formed on or over a spacer substrate 160. The electrodes 152 may be, for example, indium tin oxide (ITO) electrodes. The spacer substrate 160 should be light transmitting and may be insulative. For example, the spacer substrate 160 may be formed using a polymide or similar material.

The interdigitated comb fingers 132 of the comb drives 130 need to be thick enough to maintain a large force between the movable and stationary comb fingers 134 and 136 when the microlens 110 is pulled down by the electrostatic force applied to the support member 120 by the electrodes 152 into a pulled-down position. For example, with 50 $\mu$m thick comb fingers 134 and 136, a desirable amount of focus adjustment along the focus axis 220 is possible without affecting the resonance frequency and the dynamic switching range of the comb drives 130 along the motion axis 210. In various exemplary embodiments, a distance between the electrodes 152 and the microlens support member 120 is about 10 $\mu$m to provide a large enough electrostatic force to pull the support member 120 downward.

Figure 4:
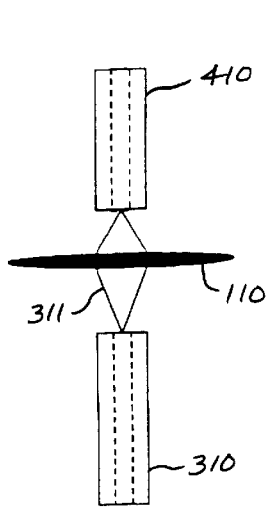
FIGS. 4, 5 and 6 are schematic views of exemplary embodiments of a microlens switching assembly according to this invention usable with optical fibers.
Figure 5:
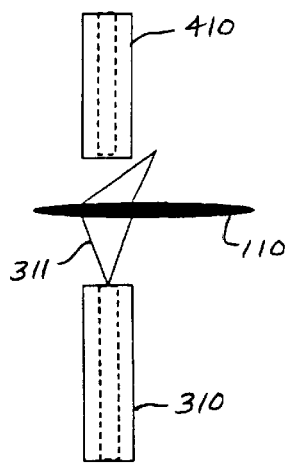
Figure 6:
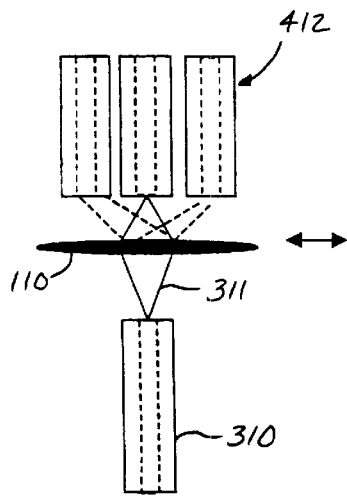

FIGS. 4–6 show exemplary embodiments of the microlens switching assembly according to the invention used with one or more optical fibers. As shown in FIG. 4, an input optical fiber 310 transmits a signal 311 to an output optical fiber 410 when the microlens 110 is in a first, or "on", position. In various exemplary embodiments, the input optical fiber 310 and the output optical fiber 410 are aligned with the optical axis 112 of the microlens 110 so that the "on" position is at an "at rest" position of the microlens switching assembly 100.

FIG. 5 illustrates that the microlens 110 directs the signal 311 completely away from the output optical fiber 410 when the microlens 110 is in an "off" position. It should be recognized that, if the microlens 110 is moved part way between the "on" position illustrated in FIG. 4 and the "off" position illustrated in FIG. 5, the signal 311 will be attenuated, since only part, but at least a part, of the signal 311 will be received by the output optical fiber 410.

As illustrated in FIG. 6, the output optical fiber 410 may be replaced by an array of output optical fibers 412. In this case, the microlens 110 moves between "on" and "off" positions for each of the output optical fibers of the array 412. Accordingly, the microlens switching assembly 100 allows the signal 311 to be switched to a desired one of the output optical fibers of the array 412.

The input optical fiber 310, the output optical fiber 410 and the array of output optical fibers 412 can each be held in place by a silicon fiber holder (not shown) made using bulk micromachining. Such a fiber holder will help properly align the optical fibers relative to the microlens switching assembly 100.

Figure 7:
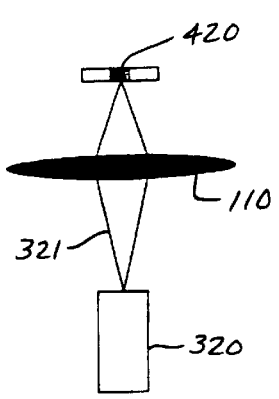
FIGS. 7, 8 and 9 are schematic views of exemplary embodiments of a microlens switching assembly according to this invention usable with a laser source and at least one photodetector.
Figure 8:
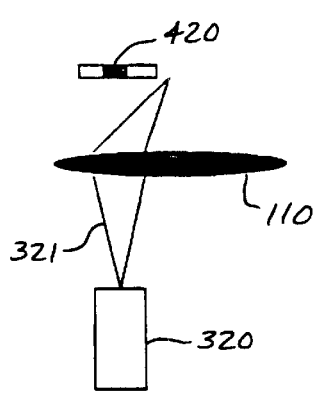
Figure 9:
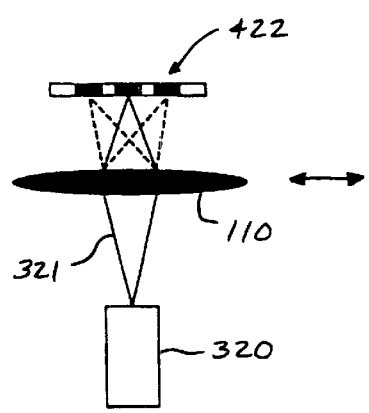

FIGS. 7–9 show exemplary embodiments of the microlens switching assembly according to the invention used with a laser light source and one or more photodetectors. As shown in FIG. 7, a laser light source 320 transmits a laser beam 321 to a photodetector 420 when the microlens 110 is in a first, or "on", position. In various exemplary embodiments, the laser light source 320 and the photodetector 420 are aligned with the optical axis 112 of the microlens 110 so that the "on" position is at an "at rest" position of the microlens switching assembly 100. FIG. 8 illustrates that the microlens 110 directs the laser beam 321 completely away from the photodetector 420 when the microlens 110 is in an "off" position.

As illustrated in FIG. 9, the photodetector 420 may be replaced by an array of photodetectors 422. In this case, the microlens 110 moves between "on" and "off" positions for each of the photodetectors of the array 422. Accordingly, the microlens switching assembly 100 allows the laser beam 321 to be switched to a desired one of the photodetectors of the array 422.

The laser light source 320 may be in any form. Suitable laser light sources include, for example, a vertical cavity surface emitting laser (VCSEL), a light emitting diode (LED), an edge emitting laser and the like.

As described above with respect to various exemplary embodiments of the microlens switching assembly, the optical switching method according to this invention comprises transmitting a signal through a movable microlens and moving the microlens in a direction perpendicular to, and optionally along, its optical axis. The microlens moves between a first position, in which the transmitted signal is directed towards a signal receiver, and at least one other position, in which the transmitted signal is directed at least partially away from the signal receiver. As noted above, moving the microlens may comprise attenuating the signal received by the signal receiver or may comprise completely removing the signal from the signal receiver.

According to the optical switching method of this invention, moving the microlens comprises actuating a first drive mechanism which moves the support member in a first direction along a motion axis and actuating a second drive mechanism which moves the support member in a second direction along the motion axis opposite the first direction. When a microelectromechanical system-based comb drive is part of the microlens switching assembly being used for the optical switching method, moving the microlens comprises applying an actuation voltage to a comb drive that is arranged to drive the microlens in the direction perpendicular to the optical axis.

The optical switching method of the invention may further comprise suspending the microlens on a substrate, where the microlens is carried on a support member.

The optical switching method of the invention may further comprise moving the microlens in a direction parallel to the optical axis to adjust a focal point of the microlens. According to this aspect of the optical switching method of this invention, moving the microlens to adjust the focal point comprises applying an actuation voltage to a driver that is arranged to drive the microlens in the direction parallel to the optical axis.

While this invention has been described in conjunction with the exemplary embodiments outlined above, it is evident that many alternatives, modifications and variations will be apparent to those skilled in the art. For example, the microlens switching assembly may be a microlens switching assembly array, in either one or two dimensions, such that an array of optical switches is configured. Accordingly, the exemplary embodiments of the invention, as set forth above, are intended to be illustrative, not limiting. Various changes may be made without departing from the spirit and scope of the invention.

What is claimed is:

1. A microlens switching assembly, comprising:
   at least one microlens, each microlens having an optical axis;
   a signal source arranged on a first side of the at least one microlens;
   a signal receiver arranged on a second side of the at least one microlens; and
   at least one driver;
   for each microlens, a support member that carries that microlens and is non-integral with that microlens;
   wherein for each microlens, the driver for that microlens drives that microlens between a first position, in which that microlens directs a signal from the signal source to the signal receiver, and at least one other position, in which that microlens directs the signal from the signal source at least partially away from the signal receiver; and
   wherein for each microlens the driver for that microlens drives the support member for that microlens in the direction perpendicular to the optical axis.

2. The microlens switching assembly of claim 1, wherein the support member is a silicon-on-insulator wafer.

3. The microlens switching assembly of claim 1, wherein, for each support member, that support member is suspended by at least one flexible structure.

4. The microlens switching assembly of claim 3, wherein, for each support member, the at least one flexible structure comprises a pair of folded springs disposed on opposite sides of the support member.

5. The microlens switching assembly of claim 1, wherein:
   the signal source comprises an input optical fiber;
   the signal receiver comprises an output optical fiber; and
   for each microlens, the driver for that microlens drives that microlens between a first position, in which that microlens directs the signal from the input optical fiber to the output optical fiber, and at least one other position, in which that microlens directs the signal from the input optical fiber at least partially away from the output optical fiber.

6. The microlens switching assembly of claim 1, wherein:
   the signal source comprises an input optical fiber;
   the signal receiver comprises an array of output optical fibers; and
   for each microlens, the driver for that microlens drives that microlens between a plurality of positions, wherein, for each position, that microlens directs the signal from the input optical fiber to a desired one of the output optical fibers of the array.

7. The microlens switching assembly of claim 1, wherein:
   the signal source comprises a laser light source;
   the signal receiver comprises a photodetector; and
   for each microlens, the driver for that microlens drives that microlens between a first position, in which that microlens directs laser light from the laser light source to the photodetector, and a second position, in which that microlens directs laser light from the laser light source away from the photodetector.

8. The microlens switching assembly of claim 1, wherein:
   the signal source comprises a laser light source;
   the signal receiver comprises an array of photodetectors; and
   for each microlens, the driver for that microlens drives that microlens between a first position and a second position for at least some of the photodetectors of the array so that microlens directs laser light from the laser light source to a desired one of the photodetectors of the array.

9. The microlens switching assembly of claim 1, wherein:
   the signal receiver comprises an array of signal receivers; and
   for each microlens, the driver for that microlens drives that microlens between a plurality of positions, wherein, for each position, that microlens directs the signal from the signal source to a desired one of the signal receivers of the array.

10. The microlens switching assembly of claim 1, wherein the driver comprises a microelectromechanical system-based comb drive.

11. The microlens switching assembly of claim 1, further comprising, for each microlens, a second driver that drives that microlens in a direction parallel to the optical axis of that microlens to adjust a focal point of that microlens.

12. The microlens switching assembly of claim 11, wherein the second driver for each of at least one microlens comprises at least one electrode that electrostatically moves that microlens in the direction parallel to that microlens' optical axis.

13. A microlens switching assembly, comprising:
   at least one microlens, each microlens having an optical axis;
   a signal source arranged on a first side of the at least one microlens;
   a signal receiver arranged on a second side of the at least one microlens; and
   at least one driver, each driver driving one of the at least one microlens in a direction perpendicular to that microlens' optical axis;
   wherein for each microlens, the driver for that microlens drives that microlens between a first position, in which that microlens directs a signal from the signal source to the signal receiver, and at least one other position, in which that microlens directs the signal from the signal source at least partially away from the signal receiver; and
   further comprising, for each microlens, a second driver that drives that microlens in a direction parallel to the optical axis of that microlens to adjust a focal point of that microlens.

14. The microlens switching assembly of claim 13, wherein the second driver for each of at least one microlens comprises at least one electrode that electrostatically moves that microlens in the direction parallel to that microlens' optical axis.

15. A method for optical switching using a microlens assembly, comprising:
   transmitting a signal through a movable microlens having an optical axis;
   moving the microlens in a direction perpendicular to the optical axis between a first position, in which the transmitted signal is directed towards a signal receiver, and at least one other position, in which the transmitted signal is directed at least partially away from the signal receiver; and
   moving the microlens in a direction parallel to the optical axis to adjust a focal point of the microlens.

16. The method of claim 15, wherein moving the microlens to adjust the focal point comprises applying an actuation voltage to a driver that is arranged to drive the microlens in the direction parallel to the optical axis.

17. The method of claim 15, wherein moving the microlens comprises applying an actuation voltage to a driver that is arranged to drive the microlens in the direction perpendicular to the optical axis.

18. The method of claim 15, wherein moving the microlens comprises partially attenuating the signal received by the signal receiver.

19. The method of claim 15, wherein moving the microlens comprises directing the signal away from the signal receiver.

20. The method of claim 15, further comprising suspending the microlens over a substrate on a support member.

21. A method for optical switching using a microlens assembly, comprising:

transmitting a signal through a movable microlens having an optical axis;

moving the microlens in a direction perpendicular to the optical axis between a first position, in which the transmitted signal is directed towards a signal receiver, and at least one other position, in which the transmitted signal is directed at least partially away from the signal receiver; and suspending the microlens over a substrate on a support member that carries the microlens and is non-integral with the microlens.

22. The method of claim 21, wherein moving the microlens comprises actuating a first drive mechanism that moves the support member in a first direction perpendicular to the optical axis and actuating a second drive mechanism which moves the support member in a second direction opposite the first direction.

* * * * *